__(12) United States Patent__
Schick et al.

(10) Patent No.: US 9,056,443 B2
(45) Date of Patent: Jun. 16, 2015

(54) BRAZING PROCESS, BRAZE ARRANGEMENT, AND BRAZED ARTICLE

(71) Applicant: GENERAL ELECTRIC COMPANY, Schenectady, NY (US)

(72) Inventors: David Edward Schick, Greenville, SC (US); Dean William Morrison, Greenville, SC (US); Yan Cui, Greer, SC (US); Bill Damon Johnston, Easley, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 131 days.

(21) Appl. No.: 13/758,458

(22) Filed: Feb. 4, 2013

(65) Prior Publication Data
US 2014/0220376 A1 Aug. 7, 2014

(51) Int. Cl.
| B23K 31/02 | (2006.01) |
| B32B 15/01 | (2006.01) |
| B23K 35/02 | (2006.01) |
| B23K 1/00 | (2006.01) |
| B23K 1/19 | (2006.01) |
| B23P 6/00 | (2006.01) |
| F01D 5/00 | (2006.01) |

(52) U.S. Cl.
CPC .......... *B32B 15/01* (2013.01); *Y10T 428/12493* (2015.01); *B23K 35/0238* (2013.01); *B23K 35/0222* (2013.01); *B23K 1/0018* (2013.01); *B23P 6/002* (2013.01); *F01D 5/005* (2013.01); *B23K 2201/001* (2013.01); *B23K 1/19* (2013.01); *F05D 2230/237* (2013.01)

(58) Field of Classification Search
None
See application file for complete search history.

(56) References Cited

U.S. PATENT DOCUMENTS

| 3,390,986 | A | | 7/1968 | Stenerson |
| 3,716,347 | A | | 2/1973 | Bergstrom et al. |
| 4,053,728 | A | * | 10/1977 | Talento et al. ............... 200/267 |
| 4,854,495 | A | * | 8/1989 | Yamamoto et al. ......... 228/124.1 |
| 5,145,105 | A | * | 9/1992 | Floroski et al. .............. 228/194 |

(Continued)

FOREIGN PATENT DOCUMENTS

| EP | 1238742 A1 | 9/2002 |
| JP | 5441251 A | 4/1979 |

OTHER PUBLICATIONS

European Search Report and Written Opinion issued in connection with corresponding EP Application No. 14153553.4-1702 on May 26, 2014.

(Continued)

*Primary Examiner* — Kiley Stoner
(74) *Attorney, Agent, or Firm* — McNees Wallace & Nurick LLC (57) ABSTRACT

A brazing process, a braze arrangement, and a brazed article are disclosed. The brazing process includes brazing an article with a braze arrangement. The braze arrangement includes a first braze material and a second braze material, the first braze material having a first melting point and the second braze material having a second melting point, the first melting point differing from the second melting point. The brazed article includes a treatment region, a first brazed material positioned within the treatment region, and a second brazed material positioned distal from the article in comparison to the first brazed material. The first brazed material is formed by the first braze material and the second brazed material is formed by the second braze material.

20 Claims, 4 Drawing Sheets

(56) References Cited

U.S. PATENT DOCUMENTS

| | | | |
|---|---|---|---|
| 5,366,136 A * | 11/1994 | Pagnon | 228/119 |
| 5,522,134 A * | 6/1996 | Rowe et al. | 29/889.1 |
| 5,666,643 A | 9/1997 | Chesnes et al. | |
| 5,820,014 A * | 10/1998 | Dozier et al. | 228/56.3 |
| 5,890,274 A * | 4/1999 | Clement et al. | 29/527.2 |
| 5,957,364 A * | 9/1999 | Socha | 228/56.3 |
| 6,323,458 B1 * | 11/2001 | Nomura et al. | 219/148 |
| 6,540,015 B1 | 4/2003 | Kawachi et al. | |
| 6,843,823 B2 | 1/2005 | Kovacich | |
| 7,279,229 B2 | 10/2007 | Budlinger et al. | |
| 7,506,793 B2 | 3/2009 | Sathian | |
| 7,651,023 B2 | 1/2010 | Huang et al. | |
| 7,789,288 B1 | 9/2010 | Johnson et al. | |
| 8,025,203 B2 * | 9/2011 | Jabado et al. | 228/121 |
| 8,880,965 B2 * | 11/2014 | Zhang et al. | 714/726 |
| 2003/0180143 A1 * | 9/2003 | Um et al. | 415/173.1 |
| 2004/0060962 A1 * | 4/2004 | Jacobson | 228/56.3 |
| 2005/0166397 A1 * | 8/2005 | Ng | 29/889.1 |
| 2006/0071053 A1 * | 4/2006 | Garimella | 228/119 |
| 2007/0228108 A1 * | 10/2007 | Goldschmidt et al. | 228/119 |
| 2008/0011813 A1 * | 1/2008 | Bucci et al. | 228/119 |
| 2008/0017694 A1 * | 1/2008 | Schnell et al. | 228/119 |
| 2008/0230156 A1 * | 9/2008 | Abriles et al. | 148/559 |
| 2009/0014505 A1 * | 1/2009 | Cretegny et al. | 228/248.1 |
| 2009/0026182 A1 * | 1/2009 | Hu et al. | 219/121.64 |
| 2009/0041611 A1 * | 2/2009 | Sathian et al. | 419/29 |
| 2009/0266446 A1 * | 10/2009 | Minor et al. | 148/24 |
| 2010/0000976 A1 * | 1/2010 | Ott et al. | 219/121.17 |
| 2010/0062151 A1 * | 3/2010 | Tuppen et al. | 427/140 |
| 2010/0062180 A1 * | 3/2010 | Tuppen et al. | 427/555 |
| 2010/0108745 A1 * | 5/2010 | Heinz et al. | 228/119 |
| 2010/0119859 A1 * | 5/2010 | Manier et al. | 428/576 |
| 2010/0196734 A1 * | 8/2010 | Svec et al. | 428/548 |
| 2010/0237134 A1 * | 9/2010 | Bucci et al. | 228/119 |
| 2010/0325887 A1 * | 12/2010 | Perret | 29/888.011 |
| 2011/0024416 A1 * | 2/2011 | Xun et al. | 220/200 |
| 2011/0076151 A1 * | 3/2011 | Cui et al. | 416/232 |
| 2012/0063911 A1 | 3/2012 | Bossmann et al. | |
| 2012/0231295 A1 * | 9/2012 | Kottilingam et al. | 428/680 |
| 2013/0020377 A1 * | 1/2013 | Stankowski et al. | 228/119 |
| 2013/0095342 A1 * | 4/2013 | Schick et al. | 428/600 |
| 2013/0136941 A1 * | 5/2013 | Zheng et al. | 428/550 |
| 2013/0195674 A1 * | 8/2013 | Watson et al. | 416/241 R |
| 2014/0154082 A1 * | 6/2014 | Shinn et al. | 416/191 |
| 2014/0170433 A1 * | 6/2014 | Schick et al. | 428/548 |
| 2014/0212681 A1 * | 7/2014 | Cui et al. | 428/548 |

OTHER PUBLICATIONS

Material Product Data Sheet, Amdry DF-4B Diffusion Braze Alloy, copyright 2012 Sulzer Metco.

Mar-M-247 Alloy. http://www.metaltek.com/alloy-guide/severe-corrosion/centri-vac-nickel-cobalt-based, Dec. 4, 2012.

* cited by examiner

BRAZING PROCESS, BRAZE ARRANGEMENT, AND BRAZED ARTICLE

FIELD OF THE INVENTION

The present invention is directed to processes, materials, and products relating to metal and metallic components. More specifically, the present invention is directed to brazing processes, brazing arrangements, and brazed products.

BACKGROUND OF THE INVENTION

Brazing is a useful process for joining two components/materials together. However, brazing can result in defects due to oxidation of surfaces and/or due to operator errors. For example, operators can use incorrect amounts of materials, resulting in undesirable properties for brazed components.

In addition, the brazing process can be dependent upon specialty materials, such as braze paste. Using braze paste results in an expense in the braze process. The braze paste itself can have a short shelf life and it be difficult to control, for example, consistency, quantity, and location of the braze paste, especially if access to the braze location is limited to the paste. If too little an amount of braze paste is applied, the part may need to be reworked or it may fail in the field. If too great an amount of braze paste is applied, the braze paste may run to undesirable areas of the part and may lead to failure in the field. In addition, use of braze paste can result in inconsistencies in the brazing process, thereby resulting in a non-uniform component being manufactured or being repaired. Furthermore, when the application of braze paste is disorderly, the result can be a scrapped part, for example, if the braze paste is accidentally applied where it is not desired.

A brazing process, a braze arrangement, and a brazed article not suffering from one or more of the above drawbacks would be desirable in the art.

BRIEF DESCRIPTION OF THE INVENTION

In an exemplary embodiment, a brazing process includes brazing an article with a braze arrangement. The braze arrangement includes a first braze material and a second braze material, the first braze material having a first melting point and the second braze material having a second melting point, the first melting point differing from the second melting point. The first braze material forms a first brazed region and the second braze material forms a second brazed region. The first braze material is arranged to form the first brazed region within a treatment region of the article.

In another exemplary embodiment, a braze arrangement includes a first braze material and a second braze material. The first braze material has a first melting point and the second braze material has a second melting point, the first melting point differing from the second melting point. The first braze material forms a first brazed region and the second braze material forms a second brazed region. The first braze material is arranged to form the first brazed region within a treatment region of the article.

In another exemplary embodiment, a brazed article includes a treatment region, a first brazed material positioned within the treatment region, and a second brazed material positioned distal from the article in comparison to the first brazed material. The first brazed material is formed by a first braze material and the second brazed material is formed by a second braze material, the first braze material having a first melting point and the second braze material having a second melting point, the first melting point differing from the second melting point.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are an exemplary brazing process, braze arrangement, and brazed article that do not suffer from one or more of the above drawbacks. Embodiments of the present disclosure, in comparison to process and articles not including one or more features disclosed herein, permit a reduction of defects in articles, permit re-working of materials to be reduced or eliminated, permit reduction or elimination of specialty materials (such as, braze paste) by being devoid or substantially devoid of such materials, permit more uniform manufacturing and repair, or a combination thereof.

Figure 1:
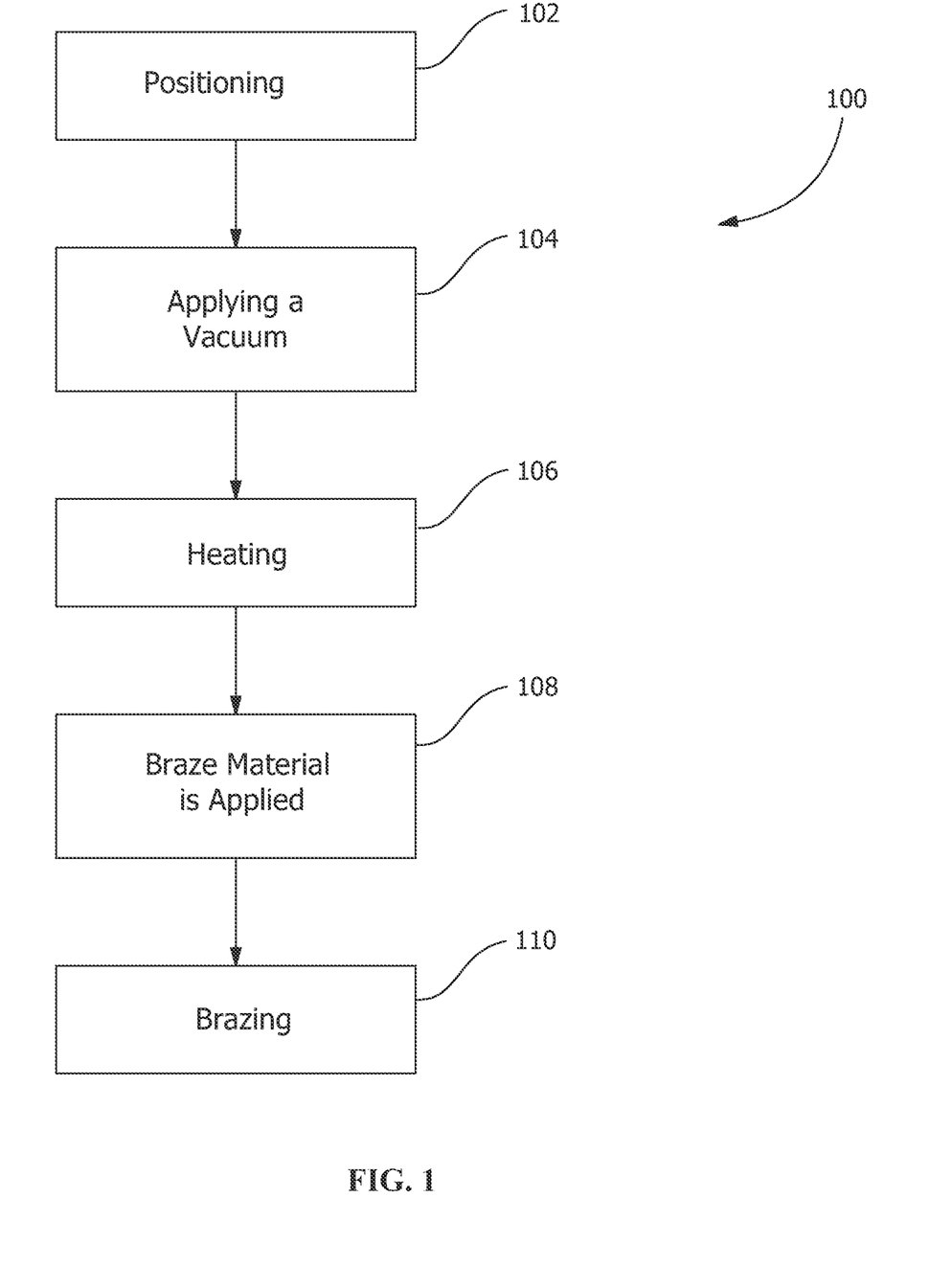
FIG. 1 is a flow diagram of an exemplary brazing process according to the disclosure.

FIG. 1 shows a brazing process 100 according to the disclosure. The brazing process 100 includes positioning (step 102). Referring to FIGS. 2-16, the positioning (step 102) includes adjusting and orienting an object to be brazed, such as an article 200, into a predetermined position, such as in a vacuum chamber 202. The predetermined positioning is in any suitable orientation with the article 200 being positioned in a braze arrangement 204 having a first braze material 302 (see FIGS. 3-16) and a second braze material 304 (see FIGS. 3-16), for example, in a braze ball 212 (see FIG. 2) and/or a powder metal. The article 200 is any suitable component. In one embodiment, the article 200 is a component of a turbine, such as a hot gas path turbine component selected from the group consisting of a blade, a dovetail of a blade, a shroud, a nozzle, a bucket, or any combination thereof. For example, in one embodiment, an opening/aperture from the casting process of a bucket is plugged according to the process 100.

The first braze material 302 and/or the second braze material 304 are one or more suitable braze structures. In one embodiment, the first braze material 302 and/or the second braze material 304 are one or more pre-sintered preforms (PSP), such as PSP braze ball(s), PSP chiclet(s), PSP foil(s), other suitable PSP structures, or combinations thereof. In one embodiment, the first braze material 302 and/or the second braze material 304 are layered with different materials within each layer.

The first braze material 302 and/or the second braze material 304 are any suitable material or materials capable of being brazed. The first braze material 302 and/or the second braze material 304 or layers forming the first braze material 302 and/or the second braze material 304 are any combination selected from the group of the following compositions. Likewise, the article 200 includes any suitable material having a composition selected from the following compositions.

In one embodiment, the first braze material 302 and/or the second braze material 304 composition are, by weight, between about 5.4% and about 5.7% Al, between about 0.06% and about 0.09% C, between about 8.0% and about 8.5% Cr, between about 9.0% and about 9.5% Co, up to about 0.1% Mn (with or without being present), up to about 0.25% Si (with or without being present), between about 9.3% and about 9.7% W, incidental impurities, and a balance Ni.

In one embodiment, the first braze material 302 and/or the second braze material 304 composition are, by weight, between about 13% and about 15% Cr, between about 9% and about 11% Co, between about 3.2% and about 3.8% Al, between about 2.2% and about 2.8% Ta, between about 2.5% and about 3.0% B, up to about 0.10 Y (with or without being present), incidental impurities, and a balance Ni.

In one embodiment, the first braze material 302 and/or the second braze material 304 composition are, by weight, about 12% to about 20% Pd, about 0.1% to about 5% B/Si, about 2% to about 16% Al, about 7% to about 15% Cr, a balance of Ni, and incidental impurities.

In one embodiment, the first braze material 302 and/or the second braze material 304 composition are, by weight, about 12% to about 20% Pd, about 0.1% to about 5% B/Si, about 2% to about 16% Al, about 7% to about 15% Cr, about 3% to about 10% Ti, a balance of Ni, and incidental impurities.

In one embodiment, the first braze material 302 and/or the second braze material 304 composition is/are, by weight, about 12% to about 20% Pd, about 0.1% to about 5% B/Si, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the first braze material 302 and/or the second braze material 304 composition are, by weight, about 12% to about 20% Pd, about 0.1% to about 5% B/Si, about 2% to about 16% Al, about 7% to about 15% Cr, about 3% to about 10% Ti, about 1% to about 15% Co, balance of Ni.

In one embodiment, the first braze material 302 and/or the second braze material 304 composition are, by weight, about 12% to about 20% Pd, about 0.1% to about 2% B, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the first braze material 302 and/or the second braze material 304 composition are, by weight, of about 12% to about 20% Pd, about 2% to about 5% Si, about 2% to about 16% Al, about 7% to about 15% Cr, about 3% to about 10% Ti, about 1% to about 3% Ta, about 0.5% to about 3% Zr, a balance of Ni, and incidental impurities.

In one embodiment, the first braze material 302 and/or the second braze material 304 composition are, by weight, about 10% to about 15% Pd, about 3% to about 5% Si, about 15% to about 28% Ti, about 10% to about 18% Zr, a balance of Ni, and incidental impurities.

In one embodiment, the first braze material 302 and/or the second braze material 304 composition are, by weight, about 12% to about 20% Pd, about 0.1% to about 5% B/Si, about 2% to about 16% Al, about 7% to about 15% Cr, about 0.5% to about 2.5% Ta, a balance of Ni, and incidental impurities.

In one embodiment, the first braze material 302 and/or the second braze material 304 composition are, by weight, about 6.4% Al, about 9.3% Co, about 15.6% Cr, about 0.9% Mo, about 1.0% Ta, about 6% Ti, about 1.3% W, about 0.5% C, a balance of Ni, and incidental impurities.

In one embodiment, the first braze material 302 and/or the second braze material 304 composition are, by weight, about 0.15% to about 0.19% C, about 13.7% to about 14.3% Cr, about 9.0% to about 10.0% Co, about 4.8% to about 5.2% Ti, about 2.8% to about 3.2% Al, about 3.7% to about 4.3% W, about 3.7% to about 4.3% Mo (with about 7.7% minimum W and Mo combined), a balance of Ni.

In one embodiment, the first braze material 302 and/or the second braze material 304 composition are, by weight, up to between about 0.02% to about 0.05% C (or more specifically 0% C), between about 8% and about 23% Cr (or more specifically between about 14.8% and about 15.8% Cr or at about 15.3% Cr), between about 4% and about 18% Co (or more specifically, between about 9.5% and about 11.0% Co or at about 10.25% Co), between about 1.5% and about 6.0% Ta (or more specifically, between about 3.0% and about 3.8% Ta or at about 3.4% Ta), between about 1.0% and about 6.0% Al (or more specifically, between about 3.2% and about 3.7% Al or 3.45% Al), between about 0.3% and 1.5% B (or more specifically, between about 0.8 and about 1.2% B or 1.0% B), between about 2.0% and about 6.0% Si (or more specifically, between about 3.5% and about 4.1% Si or about 3.8% Si), a balance of Ni, and incidental impurities.

In one embodiment, the first braze material 302 and/or the second braze material 304 composition are, by weight, between about 11.45% and about 12.05% Co, between about 6.6% and about 7.0% Cr, between about 5.94% and about 6.3% Al, between about 1.3% and about 1.7% Mo, between about 4.7% and about 5.0% W, between about 6.2% and about 6.5% Ta, between about 2.6% and about 3.0% Re, between about 1.3% and about 1.7% Hf, between about 0.10% and about 0.14% C, up to about 0.02% Ti, a balance of Ni, and incidental impurities.

In one embodiment, the first braze material 302 and/or the second braze material 304 composition are, by weight, between about 0.13% and about 0.19% C, between about 13.7% and about 14.3% Cr, between about 9.0% and about 10.0% Co, between about 4.6% and about 5.2% Ti, between about 2.8% and about 3.2% Al, between about 0.5% and about 0.8% B, between about 4.2% and about 4.8% Si, a balance of Ni, and incidental impurities.

In one embodiment, the first braze material 302 and/or the second braze material 304 composition are, by weight, up to about 0.01% C, between about 18.5% and about 19.5% Cr, up to about 0.03% B, between about 9.8% and about 10.3% Si, a balance of Ni, and incidental impurities.

In one embodiment, the first braze material 302 and/or the second braze material 304 composition are, by weight, between about 8% and about 23% Cr, between about 4% and about 18% Co, between about 1.5% and about 6.0% Ta, between about 1.0% and about 6.0% Al, between about 0.3% and about 1.5% B, between about 2.0% and about 6.0% Si, up to about 0.2% C, a balance of Ni, and incidental impurities.

In one embodiment, the first braze material 302 and/or the second braze material 304 composition are, by weight, between about 0.15% and about 0.19% C, between about 13.7% and about 14.3% Cr, between about 9.0% and 10.0% Co, between about 4.8% and about 5.2% Ti, between about 2.8% and about 3.2% Al, between about 3.7% and about 4.3% W, between about 3.7% and about 4.3% Mo (or more specifically, more than about 7.7% W and Mo combined), a balance Ni, and incidental impurities.

In one embodiment, the first braze material 302 and/or the second braze material 304 composition are, by weight, between about 0.10% and about 0.14% C, between about 6.6% and about 7.0% Cr, about 11.45% Co, up to about 0.2% Ti, between about 6.2% and about 6.5% Ta, between about 5.94% and about 6.3% Al, between about 4.7% and about 5.0% W, between about 1.3% and about 1.7% Mo, between about 1.3% and about 1.7% Hf, between about 2.6% and about 3.0% Re, a balance of Ni, and incidental impurities.

In one embodiment, the first braze material 302 and/or the second braze material 304 composition are, by weight, between about 0.01 and about 0.03% C, between about 7.4% and about 7.8% Cr, between about 2.9% and about 3.3% Co, between about 5.3% and about 5.6% Ta, between about 7.6% and about 8.0% Al, between about 3.7% and about 4.0% W, between about 0.01% and about 0.02% B, between about 0.12% and about 0.18% Hf, between about 1.5% and about 1.8% Re, between about 0.5% and about 0.6% Si, a balance of Ni, and incidental impurities.

In one embodiment, the first braze material 302 and/or the second braze material 304 composition are, by weight, up to about 0.05% C, between about 14.8% and about 15.8% Cr, between about 9.5% and about 11.0% Co, between about 3.0% and about 3.8% Ta, between about 3.2% and about 3.7% Al, between about 2.1% and about 2.5% B, a balance of Ni, and incidental impurities.

In one embodiment, the first braze material 302 and/or the second braze material 304 composition are, by weight, up to about 0.01% C, between about 18.5% and about 19.5% Cr, up to about 0.03% B, between about 9.8% and about 10.3% Si, a balance of Ni, and incidental impurities.

In one embodiment, the first braze material 302 and/or the second braze material 304 composition are, by weight, about 50.25% Ni, about 42% Fe, about 4.5% Si, about 3.25% B, and incidental impurities.

In one embodiment, the first braze material 302 and/or the second braze material 304 composition are, by weight, between about 15.0% and about 17.0% Mo, between about 14.5% and about 16.5% Cr, between about 4.0% and about 7.0% Fe, between about 3.0% and about 4.5% W, up to about 2.5% Co, a balance Ni, and incidental impurities.

In one embodiment, the first braze material 302 and/or the second braze material 304 composition are, by weight, between about 9% and about 11% Co, between about 7% and about 9% Cr, between about 9% and about 11% W, between about 2.5% and about 3.5% Ta, between about 5% and about 6% Al, between about 0.5% and about 1.5% Ti, between about 0.6% and about 0.8% Mo, between about 1.3% and about 1.7% Hf, between about 0.03% and about 0.08% Zi, between about 0.01% and about 0.02% B, between about 0.13% and about 0.17% C, a balance Ni, and incidental impurities.

In one embodiment, the first braze material 302 and/or the second braze material 304 composition are, by weight, between about 19% and about 21% Cr, between about 2.5% and about 3.5% Ta, between about 2.5% and about 3.5% B, between about 0.003% and about 0.005% Y, a balance of Ni, and incidental impurities.

In one embodiment, the first braze material 302 and/or the second braze material 304 composition are, by weight, about 0.1% C, about 22% Cr, about 9% Mo, about 0.5% W, about 1% Co, about 19% Fe, a balance Ni, and incidental impurities.

In one embodiment, the first braze material 302 and/or the second braze material 304 composition are, by weight, about 0.1% C, about 22% Cr, about 2% Mo, about 14% W, about 0.3% Al, about 0.5% Mn, about 0.4% Si, about 0.02% La, a balance Ni, and incidental impurities.

In one embodiment, the first braze material 302 and/or the second braze material 304 composition are, by weight, about 10% W, about 10% Co, about 8% Cr, about 5% Al, about 3% Ta, about 1% Hf, about 1% Ti, about 0.7% Mo, about 0.2% C, a balance of Ni, and incidental impurities.

In one embodiment, the first braze material 302 and/or the second braze material 304 composition are, by weight, between about 15.0% and about 17.0% Mo, between about 14.5% and about 16.5% Cr, between about 4.0% and about 7.0% Fe, between about 3.0% and about 4.5% W, up to about 2.5% Co, a balance Ni, and incidental impurities.

In one embodiment, the first braze material 302 and/or the second braze material 304 composition are, by weight, about 16% Cr, about 16.5% Mo, about 4% W, about 5.5% Fe, about 1% Co, a balance Ni, and incidental impurities.

In one embodiment, the first braze material 302 and/or the second braze material 304 composition are, by weight, between about 19% and about 21% Cr, between about 2.5% and about 3.5% Ta, between about 2.5% and about 3.5% B, between about 0.003% and about 0.005% Y, a balance Ni, and incidental impurities.

In one embodiment, the first braze material 302 and/or the second braze material 304 composition are, by weight, about 19.7% Cr, about 3.1% Ta, about 3.1% B, about 0.001% Y, a balance Ni, and incidental impurities.

In addition to or alternative to composition, the first braze material 302, the second braze material 304, material of the article 200, materials for additional braze materials (such as a third braze material or a fourth braze material), or any combination thereof differ based upon any suitable properties and/or features. Suitable properties include, but are not limited to, melting point, microstructure, density, viscosity at given temperatures (when in liquid form), viscosity profiles (when in liquid form), ductility, resistance to fatigue, adhesion properties, boiling point and/or sublimation profiles, quantity and/or volume, concentration, rate of diffusion of the liquid into the solid part, distance of diffusion into the solid part, or a combination thereof.

In one embodiment, the first braze material 302 and the second braze material 304 differ in melting point by about 50° C., 100° C., 150° C., between about 50° C. and about 100° C., between about 50° C. and about 150° C., between about 100° C. and about 150° C., or any suitable combination, sub-combination, range, or sub-range therein. In one embodiment, the first braze material 302 or the second braze material 304 has a melting point between about 1100° C. and about 1150° C., between about 1120° C. and about 1130° C., about 1122° C., or any suitable combination, sub-combination, range, or sub-range therein. In one embodiment, the first braze material 302 or the second braze material 304 has a melting point between about 1400° C. and about 1500° C., between about 1425° C. and about 1475° C., between about 1440° C. and about 1460° C., at about 1453° C., or any suitable combination, sub-combination, range, or sub-range therein.

In one embodiment, the first braze material 302 and the second braze material 304 differ in quantity and/or volume within the braze arrangement 204. Suitable volume ratios include, but are not limited to, the first braze material 302 being about 95 percent and the second braze material 304 being about 5 percent, the first braze material 302 being about 90 percent and the second braze material 304 being about 10 percent, the first braze material 302 being about 80 percent and the second braze material 304 being about 20 percent, the first braze material 302 being about 75 percent and the second braze material 304 being about 25 percent, the first braze material 302 being about 70 percent and the second braze material 304 being about 30 percent, the first braze material 302 being about 60 percent and the second braze material 304 being about 40 percent, the first braze material 302 being about 50 percent and the second braze material 304 being about 50 percent, the first braze material 302 being about 40 percent and the second braze material 304 being about 60 percent, the first braze material 302 being about 30 percent and the second braze material 304 being about 70 percent, the first braze material 302 being about 25 percent and the second braze material 304 being about 75 percent, the first braze material 302 being about 20 percent and the second braze material 304 being about 80 percent, or any suitable combination, sub-combination, range, or sub-range thereof.

Figure 3:
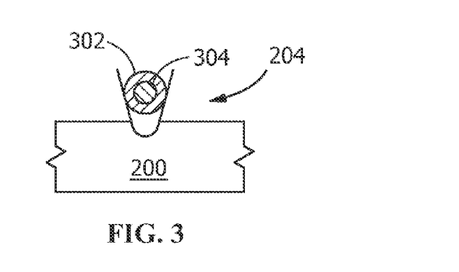
FIG. 3 is a schematic view of an exemplary braze arrangement according to an embodiment of the disclosure.
Figure 4:
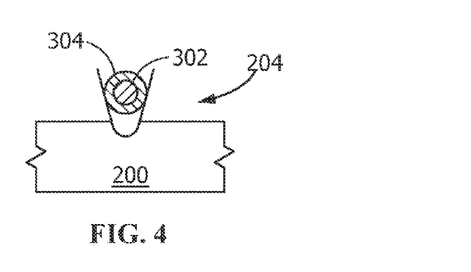
FIG. 4 is a schematic view of an exemplary braze arrangement according to an embodiment of the disclosure.

As shown in FIG. 3, in one embodiment, the first braze material 302 is arranged with the first braze material 302 surrounding the second braze material 304 in the braze arrangement 204. In another embodiment, as shown in FIG. 4, the first braze material 302 is surrounded by the second braze material 304.

Figure 5:
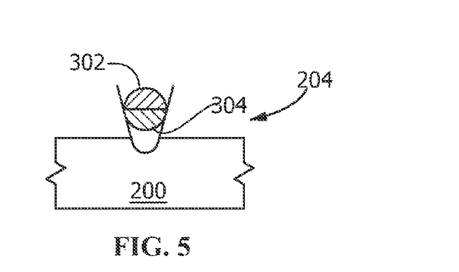
FIG. 5 is a schematic view of an exemplary braze arrangement according to an embodiment of the disclosure.
Figure 6:
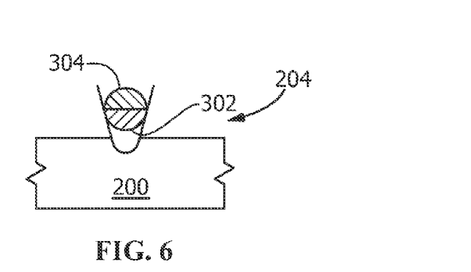
FIG. 6 is a schematic view of an exemplary braze arrangement according to an embodiment of the disclosure.

As shown in FIG. 5, in one embodiment, the first braze material 302 is at a quantity and/or volume that is equal to or substantially equal to the second braze material 304 and is arranged with the first braze material 302 being positioned distal from the article 200 in comparison to the second braze material 304 in the braze arrangement 204. In another embodiment, as shown in FIG. 6, the first braze material 302 is positioned proximal to the article 200 in comparison to the second braze material 304.

Figure 7:
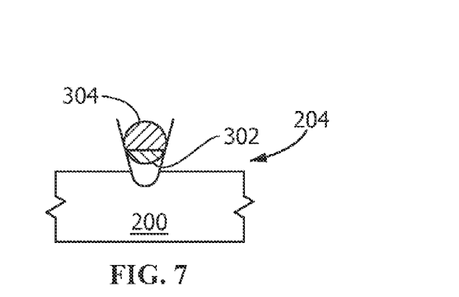
FIG. 7 is a schematic view of an exemplary braze arrangement according to an embodiment of the disclosure.
Figure 8:
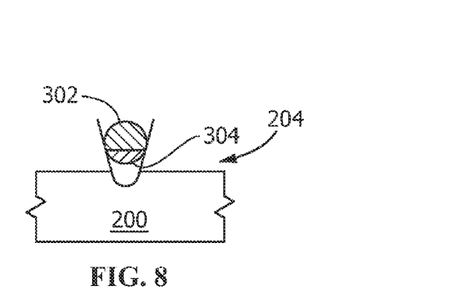
FIG. 8 is a schematic view of an exemplary braze arrangement according to an embodiment of the disclosure.

As shown in FIG. 7, in one embodiment, the first braze material 302 is at a quantity and/or volume that is less than the second braze material 304, for example, at a volume ratio of about ⅓ to about ⅔, and is arranged with the first braze material 302 being positioned proximal to or distal from the article 200 in comparison to the second braze material 304 in the braze arrangement 204. In another embodiment, as shown in FIG. 8, the first braze material 302 is at a quantity and/or volume that is greater than the second braze material 304, for example, at a volume ratio of about ⅓ to about ⅔, and is arranged with the first braze material 302 being proximal to or distal from the article 200 in comparison to the second braze material 304 in the braze arrangement 204.

Figure 9:
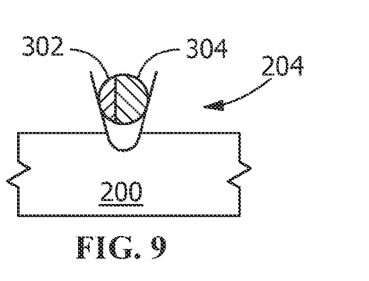
FIG. 9 is a schematic view of an exemplary braze arrangement according to an embodiment of the disclosure.
Figure 10:
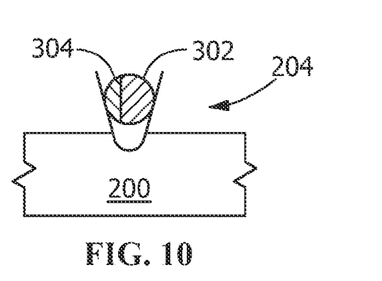
FIG. 10 is a schematic view of an exemplary braze arrangement according to an embodiment of the disclosure.

Referring to FIGS. 9-10, in one embodiment, the first braze material 302 is arranged with the first braze material 302 and the second braze material 304 on opposite sides of the braze arrangement 204, for example, at an equal or substantially equal ratio (not shown), at a volume ratio of about ⅓ being the first braze material 302 and about ⅔ being the second braze material 304 (see FIG. 9), at a volume ratio of about ⅓ being the second braze material 304 and about ⅔ being the first braze material 302 (see FIG. 10), or at any other suitable volume ratio. in the braze arrangement 204.

Figure 11:
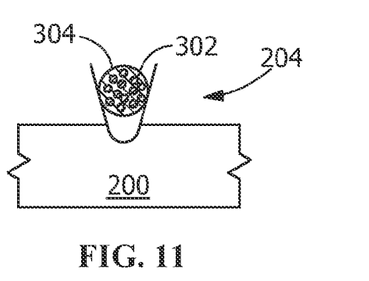
FIG. 11 is a schematic view of an exemplary braze arrangement according to an embodiment of the disclosure.
Figure 12:
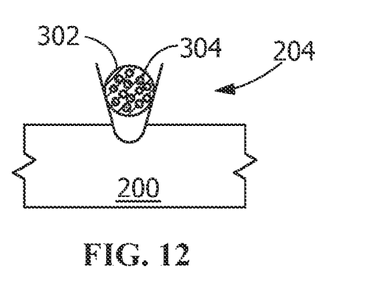
FIG. 12 is a schematic view of an exemplary braze arrangement according to an embodiment of the disclosure.

As shown in FIG. 11, in one embodiment, the first braze material 302 is at a quantity and/or volume that is equal to or substantially equal to the second braze material 304 and/or the first braze material 302 is interspersed throughout the second braze material 304 in a homogenous or substantially homogenous manner in the braze arrangement 204. Alternatively, as shown in FIG. 12, in one embodiment, the first braze material 302 is at a quantity and/or volume that is equal to or substantially equal to the second braze material 304 and/or the second braze material 304 is interspersed throughout the first braze material 302 in a homogenous or substantially homogenous manner in the braze arrangement 204.

Figure 13:
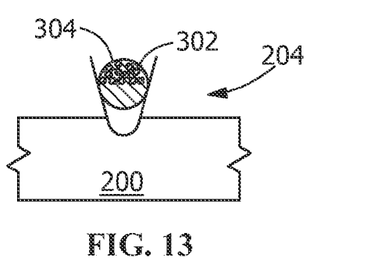
FIG. 13 is a schematic view of an exemplary braze arrangement according to an embodiment of the disclosure.
Figure 14:
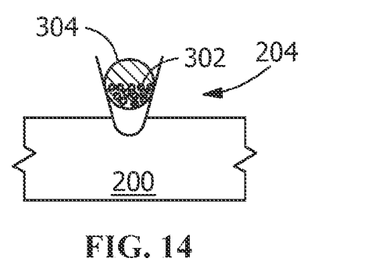
FIG. 14 is a schematic view of an exemplary braze arrangement according to an embodiment of the disclosure.

As shown in FIG. 13, in one embodiment, the first braze material 302 is at a quantity and/or volume that is equal to or substantially equal to the second braze material 304 in the braze arrangement 204. The first braze material 302 is interspersed in a heterogeneous manner with the second braze material 304, the first braze material 302 being at a higher concentration distal from the article 200 in comparison to the second braze material 304. In another embodiment, as shown in FIG. 14, the first braze material 302 is interspersed in a heterogeneous manner with the second braze material 304, the first braze material 302 being at a higher concentration proximal to the article 200 in comparison to the second braze material 304 in the braze arrangement 204.

Figure 15:
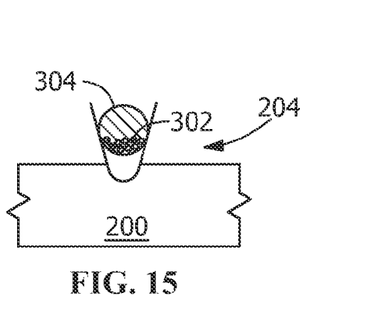
FIG. 15 is a schematic view of an exemplary braze arrangement according to an embodiment of the disclosure.
Figure 16:
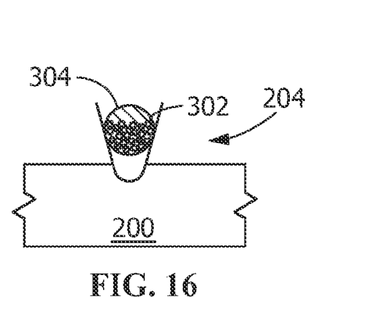
FIG. 16 is a schematic view of an exemplary braze arrangement according to an embodiment of the disclosure.

As shown in FIG. 15, in one embodiment, the first braze material 302 is at a quantity and/or volume that is less than the second braze material 304, for example, at a volume ratio of about ⅓ to about ⅔, and is interspersed in a heterogeneous manner with the first braze material 302 being positioned proximal to or distal from the article 200 in comparison to the second braze material 304 in the braze arrangement 204. In another embodiment, as shown in FIG. 16, the first braze material 302 is at a quantity and/or volume that is greater than the second braze material 304, for example, at a volume ratio of about ⅓ to about ⅔, and is interspersed in a heterogeneous manner with the first braze material 302 being proximal to or distal from the article 200 in comparison to the second braze material 304 in the braze arrangement 204.

Figure 2:
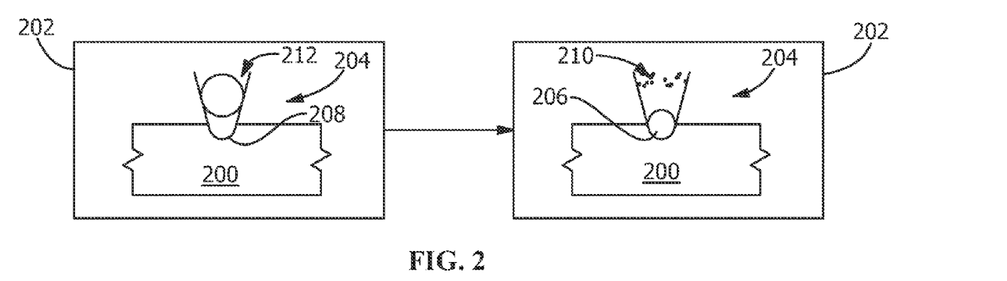
FIG. 2 is a schematic view of a braze arrangement being brazed according to an exemplary brazing process of the disclosure.

Referring again to FIG. 1, the brazing process 100 further includes applying a vacuum (step 104), for example, to the vacuum chamber 202. In one embodiment, the vacuum chamber 202 operates within a predetermined pressure range, for example, between about $10^{-1}$ torr and about $10^{-7}$ torr. The predetermined pressure range is below a pressure that reduces oxides in the article 200. For example, in one embodiment, the article 200 includes chromium oxide. In this embodiment, the article 200 is brazed at a pressure below about $10^{-1}$ torr. In one embodiment, the article 200 is a nickel-based alloy and is brazed at a pressure below about $10^{-4}$ torr. In another embodiment, a partial-pressure environment with argon, nitrogen, or hydrogen is used.

The brazing process 100 further includes heating (step 106), for example, by applying heat to the vacuum chamber 202, to the article 200, to the braze arrangement 204, to the first braze material 302 and/or the second braze material 304, or to any suitable combination thereof at a predetermined vacuum pressure. The heating (step 106) cleans and removes oxides on any and/or all exposed surface(s) within the vacuum chamber 202. Upon reaching a braze application temperature, the first braze material 302 and/or the second braze material 304 is applied (step 108).

The braze material application temperature is any suitable temperature and corresponds to the first braze material 302 and/or the second braze material 304. In one embodiment, the braze application temperature is between about −18° C. and about 93° C. below the braze temperature of the braze material 304, between about 10° C. and about 38° C. below the braze temperature of the braze material 304, between about 38° C. and about 93° C. below the braze temperature of the braze material 304, between about 38° C. and about 66° C. below the braze temperature of the braze material 304, between about 66° C. and about 93° C. below the braze temperature of the braze material 304, at about −18° C. below the braze temperature of the first braze material 302 and/or the second braze material 304, at about 10° C. below the braze temperature of the first braze material 302 and/or the second braze material 304, at about 38° C. below the braze temperature of the first braze material 302 and/or the second braze material 304, at about 66° C. below the braze temperature of the first braze material 302 and/or the second braze material 304, at about 93° C. below the braze temperature of the first braze material 302 and/or the second braze material 304, at a temperature above and pressure below that which destroys all oxidized portions, at a temperature above and pressure below that vaporizes all contaminants, or any suitable combination or sub-combination thereof.

During the braze material application (step 108), the first braze material 302 and/or the second braze material 304 is repositioned, for example, by gravity, from within the braze arrangement 204 to the article 200. In one embodiment, the article 200 includes a treatment region 208, such as one or more recesses, one or more fissures, one or more cracks, one or more joints, one or more uneven abutments, other suitable feature, or combinations thereof. The first braze material 302 and/or the second braze material 304 contact(s) and/or fill(s) all or a portion of the treatment region 208. In one embodiment, the treatment region 208 is treated with little or no oxides re-forming, in comparison to previous techniques that were unable to treat similar regions without formation of oxides.

Upon the braze material application (step 108) occurring, brazing (step 110) of the article 200 then occurs. The brazing (step 110) occurs at the braze temperature, which is based upon the first braze material 302 and/or the second braze material 304 melting and/or fusing to a portion or all of the treatment region 208, and is above the braze application temperature. In one embodiment, with the first braze material 302 and/or the second braze material 304 being a nickel-based braze alloy, the brazing application temperature is between about 871° C. and 1260° C.

Referring again to FIG. 2, a brazed region 206 is formed based upon the brazing (step 110). The brazed region 206 is formed from the first braze material 302 (See FIGS. 3-16) and/or the second braze material 304 (See FIGS. 3-16), as well as any other braze materials included. Vapor 210 from impurities or other materials (such as the first braze material 302 or the second braze material 304) is removed from the braze arrangement 204 during the brazing (step 110).

The brazed region 206 includes materials, resistance to fatigue, ductility, adhesion, microstructures, temperature resistance, or other properties and/or features based upon the first braze material 302 and/or the second braze material 304. In some embodiments, the brazed region 206 includes one or more layers formed from the first braze material 302 and the second braze material 304. In one embodiment, the brazed region 206 has shear and tensile strength above 10 ksi and/or a service temperature capability of 1090° C. or 100° C. below the braze temperature.

Figure 17:
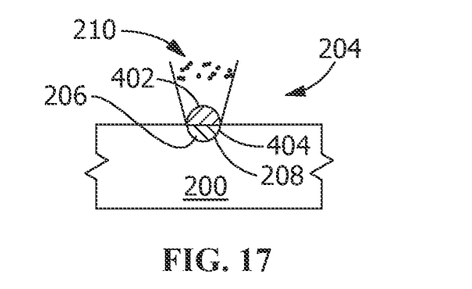
FIG. 17 is a schematic view of an exemplary brazed article according to an embodiment of the disclosure.
Figure 18:
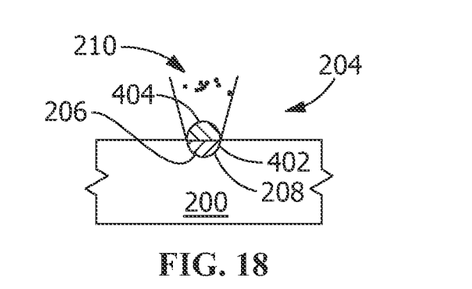
FIG. 18 is a schematic view of an exemplary brazed article according to an embodiment of the disclosure.

As shown in FIG. 17, in one embodiment, the brazed region 206 includes a first brazed region 402 (a brazing of the first braze material 302) at a volume and/or quantity equal to or substantially equal to a second brazed region 404 (a brazing of the second braze material 304). In one embodiment, the first brazed region 402 is positioned distal from the article 200 in comparison to the second brazed region 404 that is positioned within the treatment region 208 of the article 200 and/or abutting the article 200. Alternatively, as shown in FIG. 18, in one embodiment, the brazed region 206 includes the first brazed region 402 being positioned within the treatment region 208 and/or abutting the article and the second brazed region 404 being positioned distal from the article 200 in comparison to the first brazed region 402.

Figure 19:
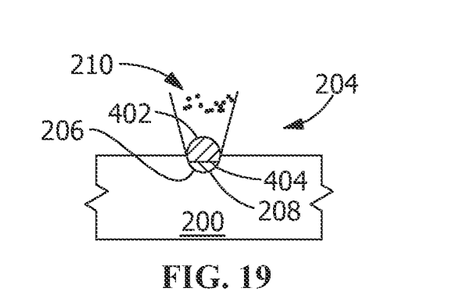
FIG. 19 is a schematic view of an exemplary brazed article according to an embodiment of the disclosure.
Figure 20:
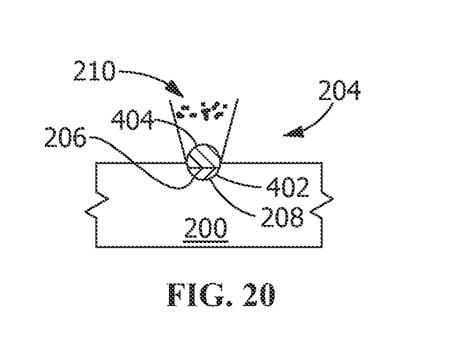
FIG. 20 is a schematic view of an exemplary brazed article according to an embodiment of the disclosure.

As shown in FIG. 19, in one embodiment, the brazed region 206 includes the first brazed region 402 (a brazing of the first braze material 302) at a quantity and/or volume ratio (such as, ⅓ to ⅔) that is greater than the second brazed region 404 (a brazing of the second braze material 304). In further embodiments, the first brazed region 402 is positioned proximal to or distal from the article 200 in comparison to the second brazed region 404. Alternatively, as shown in FIG. 20, in one embodiment, the brazed region 206 includes the first brazed region 402 (a brazing of the first braze material 302) at a quantity and/or volume ratio (such as, ⅓ to ⅔) that is less than the second brazed region 404 (a brazing of the second braze material 304). In further embodiments, the first brazed region 402 is positioned proximal to or distal from the article 200 in comparison to the second brazed region 404.

After the brazing (step 110), the article 200 is further positioned and/or treated in any suitable manner. For example, in further embodiments, the article 200 is finished, for example, by grinding, sanding, coating, otherwise treating, or combinations thereof. Additionally or alternatively, in one embodiment, the article 200 is positioned, for example, by replacing a similar article, by positioning within a system, such as a gas turbine, a wind turbine, a steam turbine, a combustion system, or other suitable system or combinations thereof. Additionally or alternatively, the article 200 is analytically tested, for example, by analytical techniques for identifying additional regions to be treated and/or for identifying whether the treatment region 208 is devoid or substantially devoid of undesirable features, such as fissures and/or re-formed oxides, or combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A brazing process, comprising:
    brazing an article with a braze arrangement;
    wherein the braze arrangement includes a first braze material and a second braze material, one of the first braze material and the second braze material being a presin- tered preform and further one of the first braze material and the second braze material being a nickel base alloy, the first braze material having a first melting point and the second braze material having a second melting point, the first melting point differing from the second melting point;

wherein the first braze material forms a first brazed region and the second braze material forms a second brazed region;

wherein the first braze material is arranged to form the first brazed region within a treatment region of the article.

2. The brazing process of claim 1, wherein the treatment region includes one or more fissures, one or more cracks, one or more joints, one or more uneven abutments, or a combination thereof.

3. The brazing process of claim 1, wherein the treatment region is an opening.

4. The brazing process of claim 1, wherein the first brazed region is formed being substantially devoid of re-formed oxides.

5. The brazing process of claim 1, wherein the first brazed region is formed being devoid of re-formed oxides.

6. The brazing process of claim 1, wherein the braze arrangement includes a pre-sintered preform, the pre-sintered preform including the first braze material and the second braze material.

7. The brazing process of claim 1, wherein the first braze material has a melting point between about 1100° C. and about 1150° C.

8. The brazing process of claim 1, wherein the second braze material has a melting point between about 1400° C. and about 1500° C.

9. The brazing process of claim 1, wherein the first braze material and the second braze material differ in composition, microstructure, density, viscosity at given temperatures, viscosity profiles, ductility, resistance to fatigue, adhesion properties, boiling point, sublimation profiles, quantity, volume, and concentration.

10. The brazing process of claim 1, wherein the first braze material is arranged with the first braze material surrounding the second braze material.

11. The brazing process of claim 1, wherein the first braze material is positioned distal from the article in comparison to the second braze material.

12. The brazing process of claim 1, wherein the first braze material and the second braze material are positioned on opposite sides of the braze arrangement.

13. The brazing process of claim 1, wherein the first braze material is interspersed throughout the second braze material in a homogenous or substantially homogenous manner.

14. The brazing process of claim 1, wherein the first braze material is interspersed in a heterogeneous manner with the second braze material.

15. The brazing process of claim 1, wherein the first braze material and the second braze material form a plurality of brazed layers.

16. The brazing process of claim 1, wherein the second brazed region is positioned distal from the article in comparison to the first brazed region.

17. The process of claim 1, wherein the first braze material and the second braze material are at an equal or substantially equal volume ratio.

18. The process of claim 1, wherein the article is a portion of a component, the component being selected from the group consisting of a hot gas path turbine component, a blade, a dovetail, a shroud, a nozzle, a bucket, and combinations thereof.

19. A braze arrangement, comprising:
a first braze material;
a second braze material,
one of the first braze material and the second braze material being a nickel base alloy, one of the first braze material and the second braze material further being a presintered preform, and
wherein the first braze material has a first melting point and the second braze material has a second melting point, the first melting point differing from the second melting point;
wherein the first braze material forms a first brazed region and the second braze material forms a second brazed region;
wherein the first braze material is arranged to form the first brazed region within a treatment region of the article.

20. A brazed article, comprising:
a treatment region;
a first brazed material positioned within the treatment region;
a second brazed material positioned distal from the article in comparison to the first brazed material;
wherein the first brazed material is formed by a first braze material and the second brazed material is formed by a second braze material, the first braze material having a first melting point and the second braze material having a second melting point, the first melting point differing from the second melting point; and
one of the first braze material and the second braze material being a nickel base alloy, one of the first braze material and the second braze material further being a presintered preform.

* * * * *